United States Patent [19]

Elfverson et al.

[11] Patent Number: 5,020,366

[45] Date of Patent: Jun. 4, 1991

[54] LIQUID LEVEL SENSOR

[75] Inventors: Sven Elfverson, Mullsjo; Kenneth Skogward, Huskvarna; Bengt Hermansson, Mullsjo, all of Sweden

[73] Assignee: Scandmec Plast AB, Sweden

[21] Appl. No.: 476,409

[22] Filed: Jun. 18, 1990

[30] Foreign Application Priority Data

Dec. 8, 1987 [SE] Sweden .............................. 8704889-8

[51] Int. Cl.⁵ ............................................ G01F 23/60
[52] U.S. Cl. ........................................ 73/313; 73/308; 73/319; 338/33
[58] Field of Search ......................... 73/319, 313, 308; 338/33; 340/623, 624

[56] References Cited

U.S. PATENT DOCUMENTS 3,433,073 3/1969 Kunent ............................. 338/33 X
4,560,986 12/1985 Lew et al. .......................... 73/313 X
4,813,282 3/1989 Maggia ................................... 73/319

Primary Examiner—Daniel M. Yasich
Attorney, Agent, or Firm—Lerner, David, Littenberg, Krumholz & Mentlik

[57] ABSTRACT

Liquid level sensor comprising a rod (2) on which a first (4) and a second (5) resistance wire are wound helically and parallel, a float (3) which is displaceable along the rod and which comprises a contact element which has a first (11) and a seond (12) contact plate, which each make contact with one of the resistance wires (4, 5) respectively, and a circuit which runs through the resistance wires and the contact element and whose resistivity varies depending on the position of hte float along the rod, in which respect the resistance wire (4) is recessed in the rod in the area in which the resistance wire (5) bears against the contact plate (12) while the resistance wire (5) is recessed in the rod in the area in which the resistance wire (4) bears against the contact plate.

5 Claims, 3 Drawing Sheets

LIQUID LEVEL SENSOR

TECHNICAL FIELD

The present invention relates to a liquid level sensor of the type which comprises a rod, of insulating material, which is surrounded by a float of insulating material which is displaceable along the rod, and a first and a second electrical resistance wire which are connected to give electrically conducting contact by means of a contact element arranged on the float, which element comprises a first contact plate for the first resistance wire and a second contact plate for the second resistance wire, and a current circuit which runs through the wires and the contact element and whose resistivity varies depending on the positions of the float along the rod.

PRIOR ART

At present there exist liquid level sensors of the type mentioned, which have one of the electrically conducting resistance wires helically wound on the rod while the second wire is connected firmly to its contact plate and is arranged such that it is helically wound in turns whose diameter greatly exceeds that of the rod and loosely such that the helical form is brought together when the float is brought to its uppermost position, the wire resting on the float.

TECHNICAL PROBLEM

This previously known liquid level sensor has, however, been shown to have disadvantages. It has happened, for example, that the loosely wound wire has prevented or at least made difficult the movement of the float along the rod.

SOLUTION

The present invention solves the abovementioned disadvantages by means of a liquid level sensor of the type mentioned in the introduction, which is characterized in that the first and the second resistance wire is wound helically and parallel about the rod, in that the first wire is recessed in the rod in the area in which the second wire bears against the contact plate and the second wire is recessed in the rod in the area in which the first wire bears against the contact plate.

The present invention is furthermore characterized in that the rod has a non-circular cross-section and in that the float has elements which prevent the float from turning about the rod.

The present invention is characterized still further in that the helically wound resistance wires have a uniform pitch along the length of the entire rod. Alternatively, the present invention can be characterized in that the helically wound resistance wires have a variable pitch.

Finally, the present invention is characterized in that the contact plates have such an axial extension that they at least extend between two consecutive winding turns of their respective resistance wire.

DESCRIPTION OF FIGURES

The present invention will be described in greater detail below with reference to the attached drawings which show a preferred embodiment of the invention. In the figures

PREFERRED EMBODIMENTS

Figure 1:
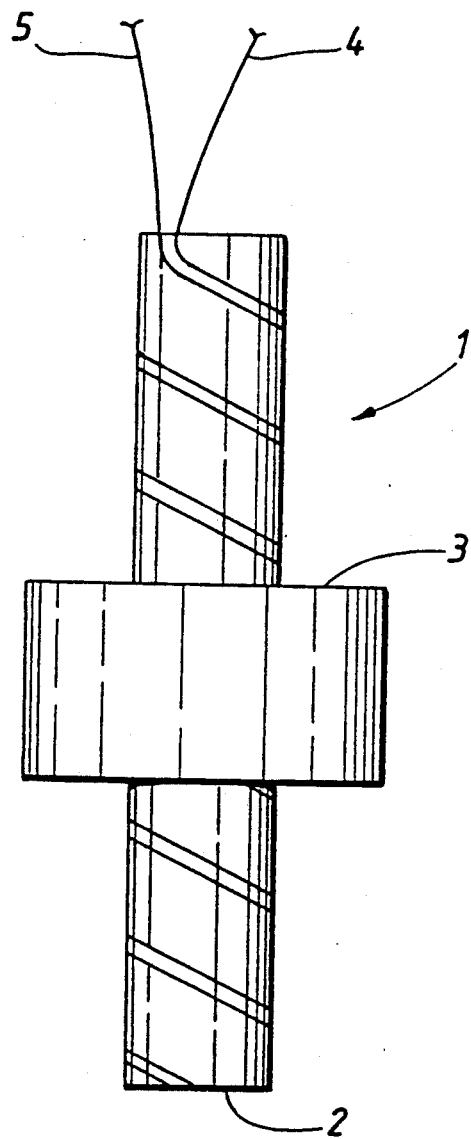
FIG. 1 shows a liquid level sensor according to the present invention seen from the side.

FIG. 1 shows a liquid level sensor 1 which comprises a rod 2 of insulating material and a float 3 of insulating material. Also shown are a first resistance wire 4 and a second resistance wire 5. The resistance wires are helically wound in a parallel fashion on the rod. The wires 4 and 5 are finished at the lower end of the rod 2, where they are each made secure in the rod (not shown) while at the opposite end they are connected to an indicating element (not shown). It should be mentioned at this point that the wires 4 and 5 can also be finished at the upper end of the rod 2, in which respect they are led into the rod at the lower end of the rod and up through it to connect with an indicating element.

Figure 2:
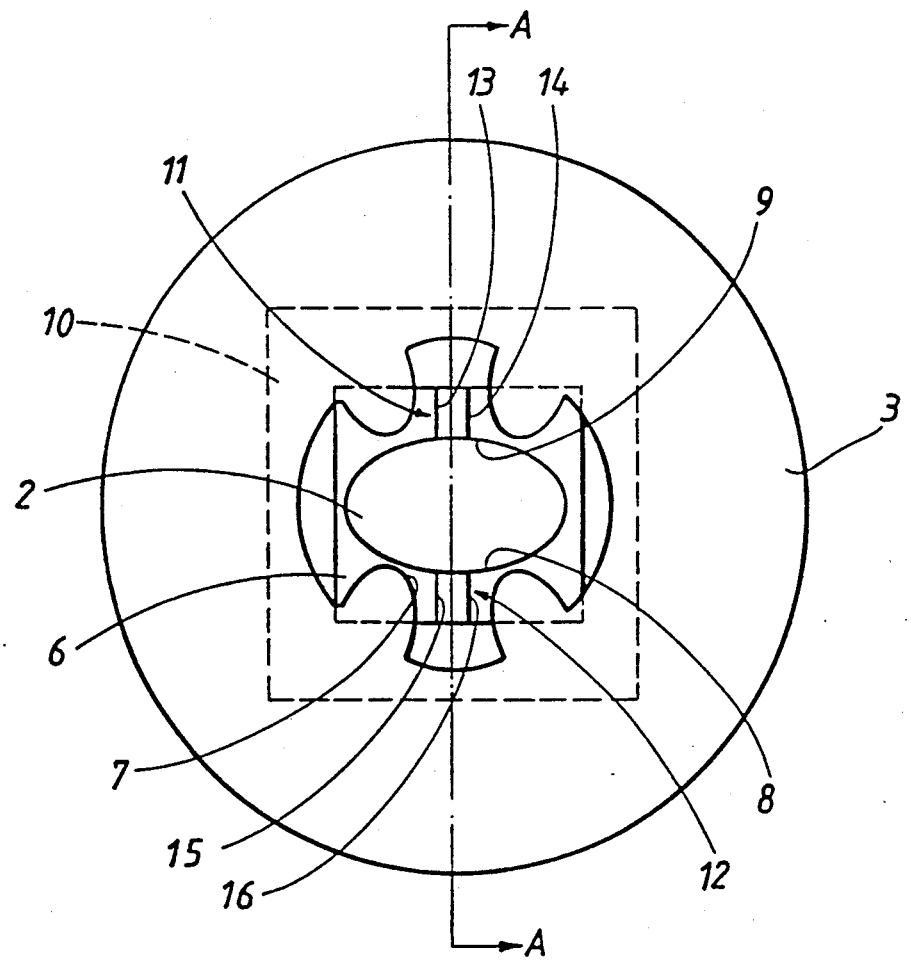
FIG. 2 shows a liquid level sensor according to the present invention seen from above.

FIG. 2 shows a liquid level sensor 1 according to the present invention seen from above. The cross-section of the rod 2 emerges from the figure, which cross-section is oval in the example shown. It further emerges that the opening 6 of the float 3, through which opening the rod 2 extends, has elements 7 which abut on the rod 2 and keep the float from turning about the rod. In the figure the cross-section of the rod 2 is shown oval with a front 8 and rear 9 side. However, it is understood that the rod 2 can have any non-circular cross-sectional form which has the property of being able to prevent the float 3 from turning about the rod 2. The figure also shows a contact element 10 which has a first contact plate 11 and a second contact plate 12. As emerges from the figure, the contact plate 11 has two bearing parts 13, 14 and the contact plate 12 two bearing parts 15, 16.

Figure 3:
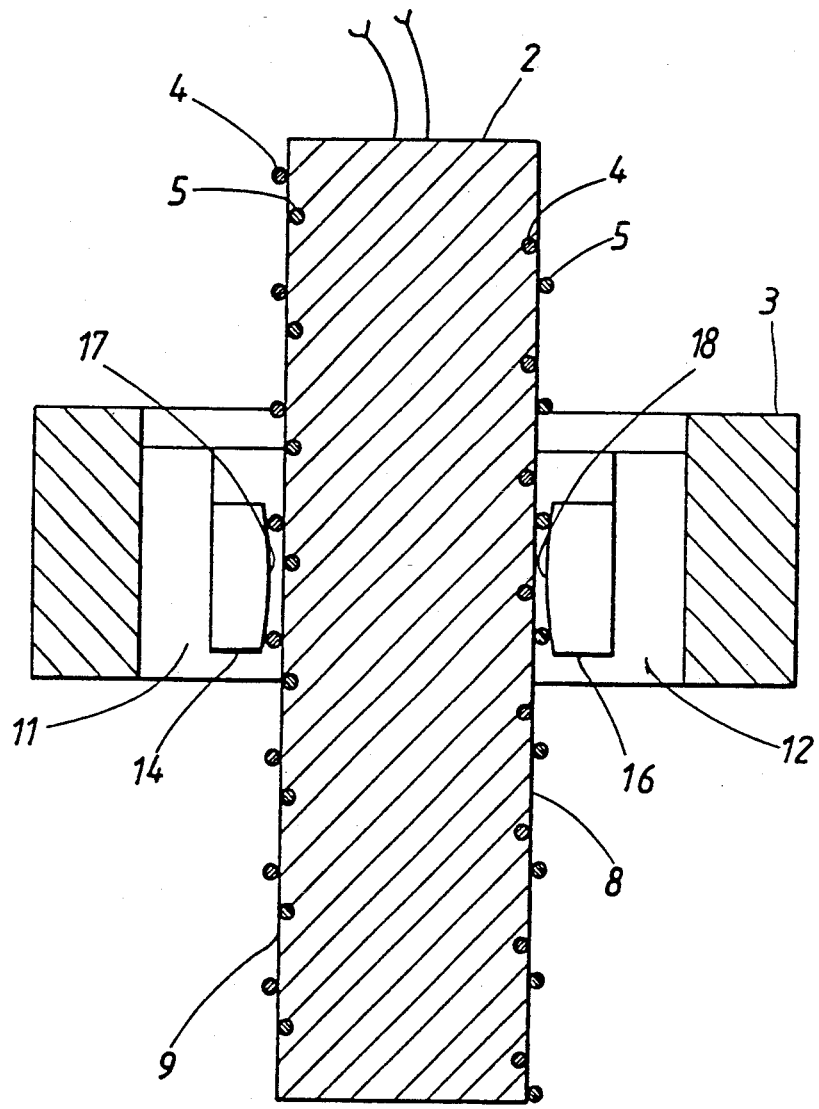
FIG. 3 shows a liquid level sensor according to the present invention seen from the side and in section A-A from FIG. 2.

It emerges from FIG. 3 that the resistance wire 4 on the side 9 lies wound on the circumferential surface of the rod 2 while, on the side 8, it lies recessed in the rod 2. It further emerges that the condition is the opposite for the resistance wire 5.

It also emerges from the figure that the bearing part 14 and the bearing part 13 (not shown) of the contact plate 11 only make contact with the resistance wire 4, as a result of the recessing of the resistance wire 5, while the bearing part 16 and the part 15 (not shown) of the contact plate 12 only make contact with the resistance wire 5. In order to ensure these contacts, the contact plates 11 and 12 are pre-stressed against the resistance wires 4 and 5.

It further emerges from FIG. 3 that the bearing parts 14, 16 of the contact plates 11, 12 have such an extension in the axial direction that they at least extend between two consecutive winding turns of the resistance wires 4, 5. In order to facilitate the movement of the bearing parts along the wires 4, 5, the latter have a slightly arched bearing surface 17 and 18 respectively. Because the float 3 and the rod 2 are arranged relative to each other so that the float 3 cannot turn about the rod 2, it is ensured that the bearing parts 13, 14 at all times make contact with the wire 4 while the bearing parts 15 and 16 at all times make contact with the wire 5.

The liquid level sensor 1 functions such that a current circuit goes from the attachment of the wire 4 in the indicating element (not shown) through the wire 4 to the contact element 10 and through this over to the resistance wire 5 and further to the indicating element (not shown). The resistivity of this current circuit, which is analyzed and converted in the indicating element, varies depending on the position of the float 3 on the rod 2.

In the embodiment shown in the figures the winding of the resistance wires has been shown with a uniform pitch. The pitch can of course be made variable when this is necessary, which can be the case when it is desirable to obtain a non-linear resistivity variation in the current circuit.

The present invention is of course not limited to the above description, but is limited only by the accompanying claims.

We claim:

1. A liquid level sensor comprising a rod of insulating material, a float of insulating material surrounding said rod and being displaceable along the rod first and second resistance wires, a contact element arranged on the float and electrically connected to said first and second resistance wires to provide a current circuit whose resistivity varies depending on the position of the float along the rod, said contact element comprising a first contact plate for the first resistance wire and a second contact plate for the second resistance wire, the float including stabilizing means for preventing said float from turning about the rod the resistance wires being wound helically and parallel about the rod with the first wire being recessed in the rod in the area in which the second resistance wire bears against the contact plate and the second wire being recessed in the rod in the area in which the first resistance wire bears against the contact plate.

2. A liquid level sensor according to claim 1, wherein the rod (2) has a non-circular cross-section.

3. A liquid level sensor according to claim 1 or 2, wherein the helically wound resistance wires have a uniform pitch along the length of the entire rod.

4. A liquid level sensor according to claim 1 or 2, wherein the helically wound wires have a variable pitch along the rod.

5. A liquid level sensor according to claim 1, wherein the contact plates extend in the axial direction between at least two consecutive winding turns of their respective first and second resistance wires.

* * * * *

UNITED STATES PATENT AND TRADEMARK OFFICE
CERTIFICATE OF CORRECTION

PATENT NO. : 5,020,366

DATED : June 4, 1991

INVENTOR(S) : Sven Elfverson, Kenneth Skogward, Bengt Hermannsson

It is certified that error appears in the above-identified patent and that said Letters Patent is hereby corrected as shown below:

```
  On the title page:
 [30]   Following "Dec. 8, 1987 [SE]   Sweden.........8704889-8",
        insert --PCT/SE88/00665......................12/06/88--.
 [57]   Line 10, "hte" should read --the--.
 Column 4, line 12, delete "(2)".
 Column 4, line 14, following "wound", insert --first and
           second--.
 Column 4, line 17, following "wound", insert --first and
           second--.
```

Signed and Sealed this

First Day of December, 1992

*Attest:*

DOUGLAS B. COMER

*Attesting Officer*    *Acting Commissioner of Patents and Trademarks*